United States Patent [19]

Wellman

[11] Patent Number: 4,800,811
[45] Date of Patent: Jan. 31, 1989

[54] DWELL-EFFECTING TWINE ARM DRIVE LINK

[75] Inventor: Stanley P. Wellman, Ottumwa, Iowa
[73] Assignee: Deere & Company, Moline, Ill.
[21] Appl. No.: 56,084
[22] Filed: Jun. 1, 1987
[51] Int. Cl.$^4$ ............................................. B65B 13/18
[52] U.S. Cl. ......................................... 100/5; 100/13; 100/88
[58] Field of Search .................. 100/13, 88, 5; 56/341

[56] References Cited

U.S. PATENT DOCUMENTS

| | | | |
|---|---|---|---|
| 4,150,614 | 4/1979 | Schwartz | 100/13 X |
| 4,248,143 | 2/1981 | Gaeddert | 100/13 |
| 4,282,803 | 8/1981 | Cools | 100/88 X |
| 4,457,226 | 7/1984 | Meiers | 100/5 |
| 4,530,279 | 7/1985 | Walker | 100/5 |

Primary Examiner—Andrew M. Falik

[57] ABSTRACT

A pair of twine arms are mounted for pivoting back and forth between first and second locations for dispensing twine into a bale chamber. The arms are oscillated by a reversible gear drive including a drive gear having a drive arm fixed thereto and coupled to an extensible and retractable hydraulic actuator through means of a resiliently extensible link which permits further extension of the actuator after the arms have engaged each other at their respective second locations. Accordingly, the arms dwell at their respective second locations, during such further extension of the actuator and then during retraction thereof until the link is restored to its normally unextended condition, thus permitting wraps of twine to be laid one on top of the other.

10 Claims, 3 Drawing Sheets

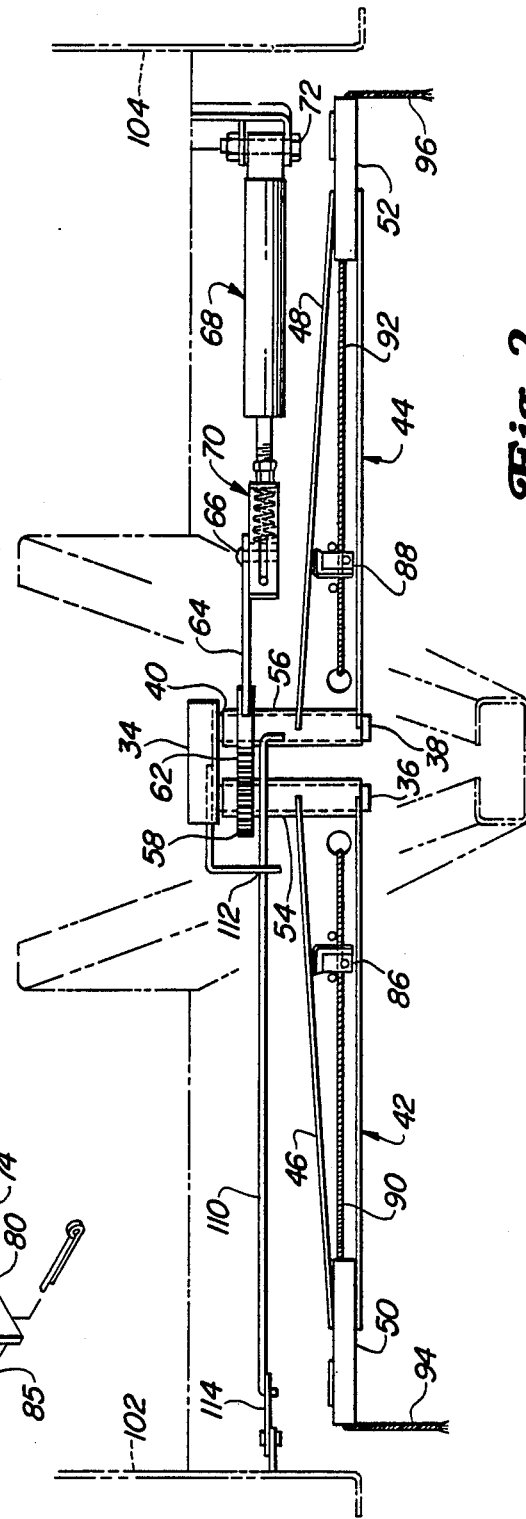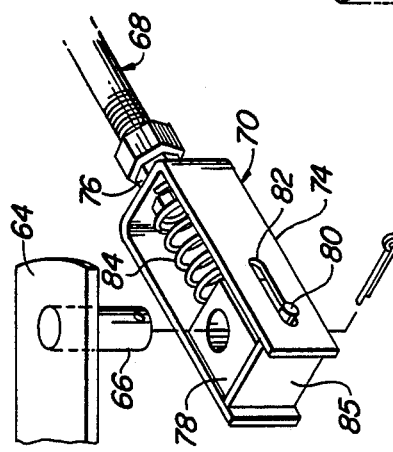

DWELL-EFFECTING TWINE ARM DRIVE LINK

BACKGROUND OF THE INVENTION

The present invention relates to twine wrapping mechanisms for applying wraps of twine to large cylindrical bales and more particularly relates to reversible drive mechanisms for oscillating one or two twine dispensing arms back and forth between transversely spaced locations adjacent the bale forming chamber resulting in a twine end dangling from the arm or arms being fed into the bale chamber between the rotating bale and belts or rolls causing such rotation whereby a length of twine is pulled through the twine arm or arms from a supply roll or rolls.

It is known to incorporate structure in a reversible twine arm drive mechanism that results in the twine arm dwelling while the drive input continues with overlapping wraps of twine thereby being applied to a preselected circumferential zone of a bale so that the twine is securely captured on the bale. For example, U.S. Pat. No. 4,457,226 issued July 3, 1984 discloses a reversible drive incorporating a drive gear coupled to an extensible and retractable hydraulic actuator and a driven gear fixed to one end of a twine dispensing arm and meshed with the drive gear whereby extension and retraction of the actuator causes the twine dispensing arm to swing back and forth between first and second locations adjacent opposite ends of the bale-forming chamber. The gears are provided with toothless sections which come into register with each other as the arm arrives at its second location and the actuator approaches the end of its extension stroke thereby causing the arm to dwell at its second location resulting in overlapping wraps of twine being applied to the bale adjacent an end thereof. The driven gear carries an arm engageable with a spring-loaded rod which acts to ensure reengagement of the toothed portions of the gears for operation during the retraction stroke of the actuator. While this patented arrangement is effective to cause a single twine arm to dwell at one of its end locations, the specially made and arranged gears bring added cost to the manufacture and assembly of the twine dispensing arm drive.

SUMMARY OF THE INVENTION

According to the present invention there is provided a dwell-effecting twine arm drive structure which represents an improvement over the dwell-effecting structure disclosed in the above-described U.S. Pat. No. 4,457,226.

An object of the invention is to provide a dwell-effecting twine arm drive structure which is constructed of simple, easy to assemble parts.

A further object of the invention is to provide a dwell effecting twine arm drive structure which may be easily retrofit to reversible twine arm drive mechanisms employing a drive gear having a drive arm fixed thereto and coupled to a drive element shiftable in opposite first and second directions.

Yet another object of the invention is to provide a dwell effecting twine arm drive structure which works equally well with single or double twine dispensing arm arrangements.

A more specific object of the invention is to provide a dwell-effecting twine arm drive structure in the form of a resiliently extensible link which is connected between a reversible drive element and a driven element located between the dive element and twine arm so that the drive element may continue movement in a first direction after the twine arm has been stopped at an end location of its cycle.

These and other objects, features and advantages of the present invention will become apparent to those skilled in the art from the description which follows and from the drawings.

BRIEF DESCRIPTION OF THE DRAWINGS

FIG. 2 is a front elevational view of the mechanism of FIG. 1 but showing the twine arms in respective transversely extending first or home locations.

FIG. 4 is a perspective view showing the resiliently extensible link and its connections to the rod end of an extensible and retractable hydraulic actuator and the drive gear arm.

DESCRIPTION OF THE PREFERRED EMBODIMENT

Figure 1:
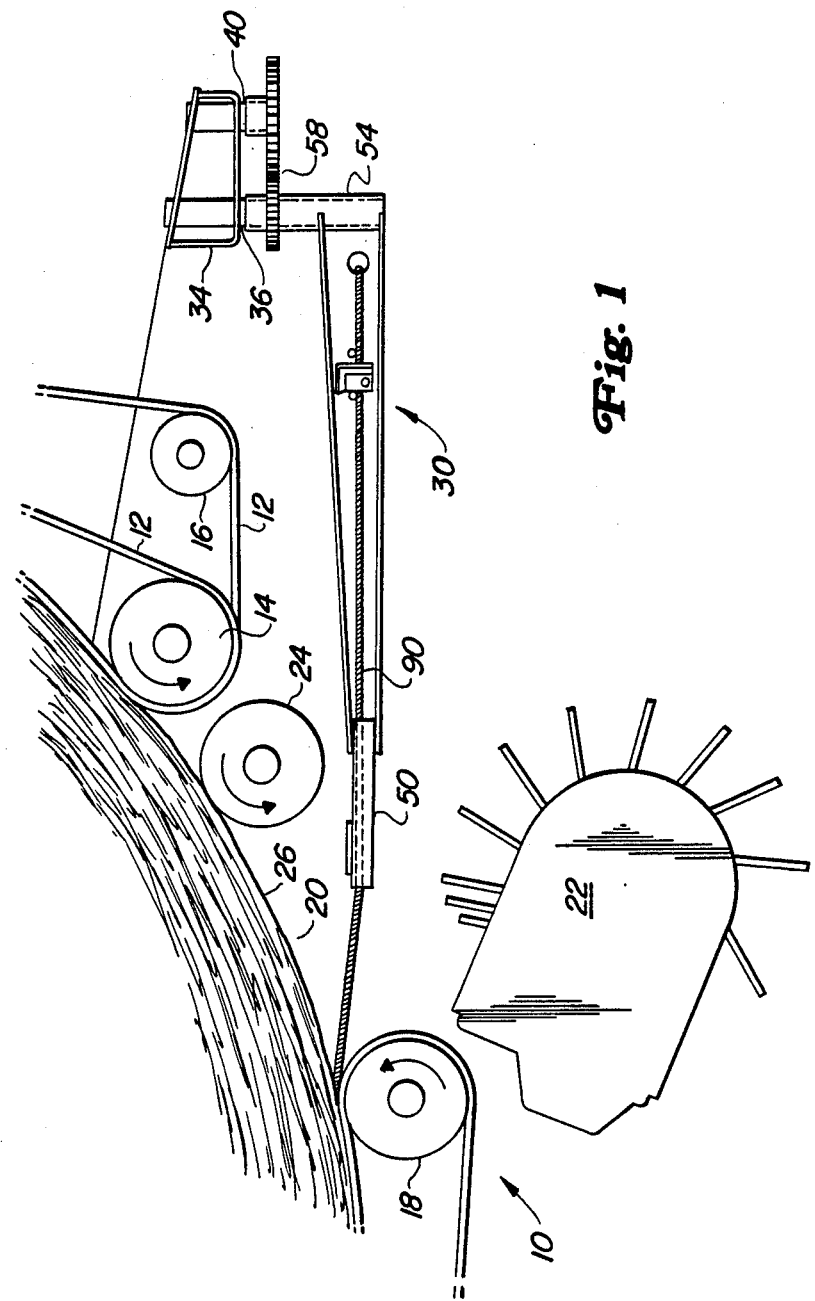
FIG. 1 is a somewhat schematic right side elevational view of a dual twine arm drive mechanism embodying the present invention and showing the visible twine arm in a rearwardly extending second location to and from which it travels during a bale wrapping cycle.

Referring now to FIG. 1, there is shown a lower forward region of a bale forming chamber 10 of a baler for making large cylindrical bales. The chamber 10 is of an expansible type delimited by a plurality of belts supported side-by-side on a plurality of rolls extending between a pair of sidewalls forming opposite ends of the chamber and in which the ends of some of the rolls are rotatably mounted with others of the rolls having their opposite ends rotatably mounted in take-up or tensioning arms vertically swingably mounted to the sidewalls. Such an expansible bale chamber is disclosed in detail in U.S. Pat. No. 4,428,282 issued on Jan. 31, 1984.

That portion of the chamber 10 illustrated in FIG. 1 includes a plurality of chamber forming belts 12 supported in side-by-side relationship across a driven roll 14, a roll 16 located ahead of the roll 14 and about which only selected ones of the belts 12 are trained so as to define a staggered array, and a bottom roll 18 which cooperates with the driven roll 14 to delimit a chamber inlet 20 through which crop is fed by a pickup 22. A driven starter roll 24 is located in the inlet 20 for cooperating with the belts 12 for initiating the rolling up of crop to form a bale core about which crop is thereafter rolled upon to form a complete bale 26, as shown.

A double twine arm assembly 30 is mounted to a cross beam (not shown) located forwardly of the bale forming chamber 10. Specifically, referring now also to FIGS. 2–5, and considering the structure as viewed facing in the forward direction of travel, the double twine arm assembly 30 includes a twine arm support 34 fixed to the underside of the cross beam and including right- and left-hand upright depending support shafts 36 and 38, respectively located on opposite sides of the fore-and-after center line of the baler and a third upright depending support shaft 40 spaced forwardly of the shaft 38. Right- and left-hand twine arms 42 and 44 are provided which are mirror images of each other. The arms 42 and 44 include respective channel-like sections 46 and 48 which, as viewed in FIG. 2, open forwardly and have respective upper and lower flanges which converge outwardly to respective twine dispensing ends defined by twine guide tubes 50 and 52. Respective inner ends of the arms 42 and 44 are defined by upright tubular members 54 and 56 which are received for rotation on the support shafts 36 and 38. Driven gears 58 and 60 have respective hubs welded to upper ends of the members 54 and 56 and are meshed with each other. A drive gear 62 in the form of a toothed semicircular segment has a hub mounted for oscillation about the support shaft 40. The drive gear 62 is meshed with the gear 60 and a drive arm 64 is secured to and projects radially from the hub of the gear 60 and carries an upright pin 66 at its outer end. An extensible and retractable hydraulic actuator 68 has its rod end connected to the pin 66 through means of a dwell-effecting, resiliently extensible link 70 and has its cylinder end coupled to the baler frame by a pivot pin 72.

As can best be seen in FIG. 4, the link 70 includes a U-shaped member 74 having its bight portion threadedly received, as at connection 76, on a threaded end of the actuator rod. A swivel block 78 is pivotally received on the pin 66 and carries a cross pin 80 having opposite ends slidably received in elongated slots 82 provided in opposite legs of the U-shaped member 74. A coil compression spring 84 is compressed between the bight portion of the member 74 and the block 78 and normally maintains the block against a plate 85 joining the ends of the legs of the member 74 with the cross pin 80 then being adjacent ends of the slots 82 which are remote from the connection 76, and thereby establishes a normally collapsed, resiliently extensible condition in the link 70.

Spring-loaded twine tensioner plates 86 and 88 are respectively mounted to the webs of the channel-like arm sections 46 and 48 and threaded through the arms 42 and 44, so as to lie beneath the respective plates 86 and 88 and pass through the guide tubes 50 and 52, are respective lengths of twine 90 and 92 which extend from respective supply rolls (not shown) and which have respective end portions 94 and 96 dangling from the tubes 50 and 52 for introduction into the bale chamber during the wrapping cycle, described in more detail below.

Figure 3:
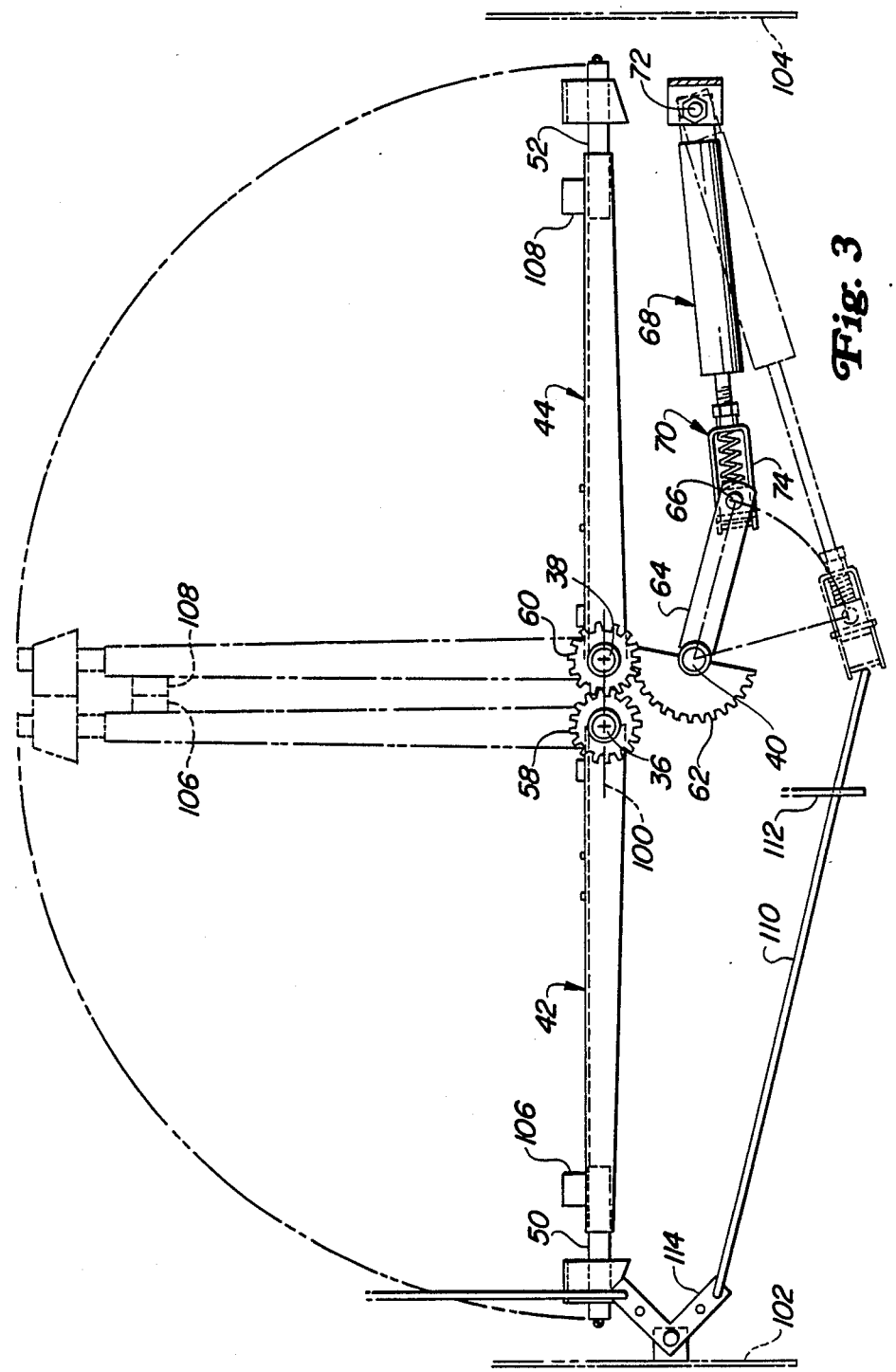
FIG. 3 is a top, elevational view of the mechanism of FIG. 2 but in addition showing the twine arms in dashed lines in their respective rearwardly projecting second locations and showing a reverser valve control lever located for engagement by the resiliently extensible link forming the essence of the present invention.

Considering FIG. 3, it will be noted that when the twine arms 42 and 44 are in their respective "home" or first locations, they project opposite one another and lie approximately on a line of centers 100 passing through the driven gears 58 and 60 with the twine guide tubes 50 and 52 respectively being disposed adjacent right- and left-hand sidewalls 102 and 104 which form end portions of the bale chamber 10. The hydraulic actuator 68 is then in a retracted condition and is positioned relative to the drive arm 64 such that extension of the actuator 68 will result in the twine arms and 44 being driven so as to pivot rearwardly towards each other to respective second positions wherein respective stop members 106 and 108 respectively located on rear surfaces of the arms 42 and 44 abut each other. This engagement of the stop members 106 and 108 occurs when the arms 42 and 44 have rotated rearwardly approximately ninety degrees and before the actuator has become completely extended, with further extension of the actuator being permitted by the dwell-effecting link 70. Specifically, once the arms 42 and 44 engage each other, further extension of the actuator results in the U-shaped member 74 being shifted relative to the swivel block 78 against action of the spring 84. A reverser valve shifter rod 110 is slidably mounted, as at 112 (FIG. 2), on the baler frame and has a free end located for engagement by the member 74, when the latter shifts relative to block 78, and has an opposite end coupled to a crank arm 114 that is pivotally mounted adjacent the sidewall 102 and coupled to a reverser valve (not shown) operable for effecting direction changes in the routing of pressure and exhaust fluid to and from the actuator so as to cause the latter to retract. Reference may be had to the aforementioned U.S. Pat. No. 4,457,226 for the details of not only how the actuator 68 is caused to retract once extended but also of how extension of the actuator 68 is automatically initiated in response to a bale formed in the chamber 10 reaching a predetermined diameter.

As the arms 42 and 44 return to their "home" or first locations, they engage respective twine cut-off blade or knife control rods (not shown) forming parts of respective twine cutting knife assemblies located adjacent the sidewalls 102 and 104 for severing twine wrapped about a completed bale at respective points located between the twine guide tubes 50 and 52 and the bale chamber 10. Details of such a twine cutting knife assembly are also disclosed in the aforementioned U.S. Pat. No. 4,457,226.

In operation, the twine wrapping cycle is preferably automatically initiated, in the manner disclosed in the aforementioned U.S. Pat. No. 4,457,226, when a bale reaches a predetermined size within the bale forming chamber 10. The twine arms 42 and 44 are then in their respective "home" or first locations with their respective twine dispensing tubes 50 and 52 disposed adjacent the right- and left-hand sidewalls 102 and 104 o the bale forming chamber 10. Initiation of the cycle results in press fluid being supplied for extending the hydraulic actuator 68 thus effecting rotation of the drive gear 62 and driven gears 58 and 60 resulting in the twine dispensing tubes 50 and 52 of the arms 42 and 44 sweeping rearwardly toward the center of the bale chamber 10. As the arms 42 and 44 approach or reach their respective rearwardly extending second locations, the twine end portions 94 and 96 dangling from the arms 42 and 44 are fed with incoming crop into the bale chamber 10 and are gripped between the completed bale and the bale chamber forming belts 12 with the rotation of the bale and belts causing tine to be pulled into the chamber. When the arms 42 and 44 reach their second locations, they abut each other and further rotation of the drive gear 62 is thus prevented. However, the actuator 68 is not then fully extended, and it will continue to extend resulting in the U-shaped member 74 of the link 70 extending so as to engage and shift the reverser valve shift rod 110 a distance sufficient to effect valve operation and the reversal of pressure and return fluid to and from the actuator 68 so as to cause it to retract. Initial retraction of the actuator 68 restores the member 74 to its non-extended position without any motion being transferred to the drive arm 64. Thus, the arms 42 and 44 dwell during the time that the member 74 is being extended and retracted and additional wraps of twine are laid one upon the other on the circumferential areas of the bale located adjacent the twine guide tubes 50 and 52. Further retraction of the actuator 68 then causes the twine arms 42 and 44 to sweep back to their respective "home" or first locations resulting in spiral wraps of twine being laid upon the bale circumference. As the twine arms approach their respective first locations, they engage respective twine cut-off blade control levers and trigger the cut-off blades (not shown) to sever the wrapped lengths of twine from the supply rolls at locations between the twine arm ends and the bale chamber. The bale is then discharged which automatically results in fluid pressure flow to the actuator being discontinued in a manner described in U.S. Pat. No. 4,457,226.

While the link 70 has been here described as used in conjunction with a twine arm drive which embodies a hydraulic drive actuator and gearing, it will be appreciated that the link 70 has application to any reversible drive employing a drive element movable generally in opposite first and second directions and to one end of which the link 70 may be connected to transfer motion thereof to an arm or arm located in the drive "downstream" from the link.

I claim:

1. In a twine dispensing mechanism of a twine wrapping mechanism for applying wraps of twine to a large cylindrical bale formed in a bale chamber having ends defined by a pair of sidewalls, the twine dispensing mechanism including at least one pivotally mounted twine arm having a dispensing end which, when the arm is oscillated, sweeps back and forth between first and second predetermined end locations of a path located adjacent to the bale chamber, and a reversible arm drive mechanism coupled to the twine arm for oscillating the same, the improvement comprising: said drive mechanism including a first member movable in opposite first and second directions and capable of respectively effecting movement of the twine dispensing end of the arm from location beyond said second location and back to said first location; stop means located for stopping movement of the twine dispensing end at said second location while said drive mechanism is moving in said first direction; and said drive mechanism further including a resiliently yieldable link means coupled to the first member for permitting continued movement of the latter in said first direction after the twine dispensing end has stopped at said second location thereby effecting a dwell period whereby the twine dispensing mechanism is adapted for applying extra wraps of twine to a peripheral area of a bale near the second location.

2. The twine dispensing mechanism defined in claim 1 wherein said drive mechanism includes a second member; said resiliently yieldable link means including an elongate spring housing connected at one end to the first member, a trunnion reciprocably mounted in said housing for movement toward and away from the first member and being coupled to the second member and a coil compression spring mounted in the housing and normally biasing the trunnion in said first direction away from the first member and said stop means also acting to prevent movement of the second member once the dispensing end of the arm stops while the first member continues to move in the first direction whereby the housing then moves with the first member relative to the trunnion and compresses the spring.

3. The wine dispensing mechanism defined in claim 1 and further including an adjustable connection between the first member and the link means for varying said dwell period.

4. The twine dispensing mechanism defined in claim 3, wherein said connection mean includes a length adjustable threaded engagement between the first member and link means.

5. The twine dispensing mechanism defined in claim 4 wherein said threaded engagement is effected by a threaded rod forming an end of said first member and a threaded opening located in the spring housing in lengthwise alignment with the housing and receiving the threaded rod.

6. In a twine dispensing mechanism of a twine wrapping mechanism for a round baler having a bale forming chamber formed between a pair of sidewalls and including at least one twine arm having a driven gear fixed to one end, and mounted for rotation about an upwardly projecting first axis, a drive gear mounted for rotation about a second axis extending parallel to the first axis and being meshed with the driven gear with the gears and the one twine arm being located such that oscillation of the drive gear will result in a twine dispensing end of the arm sweeping back and forth between first and second locations located between the pair of sidewalls of the chamber, and an extensible and retractable hydraulic actuator being coupled for effecting oscillation of the drive gear, the improvement comprising: abutment means for preventing movement of the dispensing end of the one twine arm beyond said second location; a resiliently yieldable link means connecting one end of the hydraulic actuator to said drive gear for permitting continuance of one of extension or retraction of the actuator after the dispensing end of the one twine arm stops at said second location.

7. The twine dispensing mechanism defined in claim 6 wherein said resiliently yieldable link means includes an elongate spring housing having a threaded aperture at one end; said hydraulic actuator including a threaded rod end received in said aperture; a trunnion slidably mounted to said spring housing for movement lengthwise thereof toward and away from said one end and being coupled to said driven gear; and a compression spring compressed between the trunnion and the one end of the spring housing.

8. The twine dispensing mechanism defined in claim 7 wherein said spring housing has opposite legs joined by a bight portion so as to be U-shaped; said threaded aperture being in the bight portion; said trunnion having a pin extending therethrough; slots being provided in the opposite legs and respectively slidably receiving opposite ends of said pin; and a coil compression spring being compressed between the bight portion and said trunnion.

9. The twine dispensing mechanism defined in claim 8 and further including a reversing valve means for reversing operation of said hydraulic actuator; an operating linkage means coupled to the valve means and including a valve operating rod located for engagement by said spring housing only upon the latter being moved relative to said trunnion after the one twine arm engages said abutment means.

10. The twine dispensing mechanism defined in claim 6 wherein the first and second locations of the twine dispensing arm of the one twine arm are respectively adjacent one of the pair of sidewalls and approximately halfway between the pair of sidewalls; a second twine arm having a second driven gear fixed to one end thereof, meshed with the driven gear fixed to the first twine arm and mounted for oscillation about a third axis extending parallel to the first and second axes; said second driven gear being of a size effecting movement of a twine dispensing end of the second twine arm between a third location adjacent another of the pair of sidewalls and a fourth location approximately halfway between the pair of sidewalls when the one twine arm dispensing end moves from its first to its second location; and said abutment means comprising respective surfaces of said one and second twine arms which engage each other when the dispensing ends of the twine arm respectively reach their second and fourth locations.

* * * * *

UNITED STATES PATENT AND TRADEMARK OFFICE
CERTIFICATE OF CORRECTION

PATENT NO. : 4,800,811

DATED : Jan. 31, 1989

INVENTOR(S) : Stanley Paul Wellman

It is certified that error appears in the above-identified patent and that said Letters Patent is hereby corrected as shown below:

```
In Col. 5, line 34, after "from" insert, -- the
    first --;
In Col. 5, line 61, change "wine" to -- twine --; and
In Col. 5, line 66, change "mean" to -- means --.
```

Signed and Sealed this

Ninth Day of January, 1990

*Attest:*

JEFFREY M. SAMUELS

*Attesting Officer*     *Acting Commissioner of Patents and Trademarks*